US010555316B2

(12) United States Patent
Gurney

(10) Patent No.: US 10,555,316 B2
(45) Date of Patent: Feb. 4, 2020

(54) SYSTEM AND METHOD FOR ASSIGNING FREQUENCY RESOURCE ALLOCATION TO COMMUNICATION DEVICES

(71) Applicant: MOTOROLA SOLUTIONS, INC., Schaumburg, IL (US)

(72) Inventor: David P. Gurney, Carpentersville, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 304 days.

(21) Appl. No.: 15/276,192

(22) Filed: Sep. 26, 2016

(65) Prior Publication Data

US 2018/0092103 A1    Mar. 29, 2018

(51) Int. Cl.
*H04W 72/08* (2009.01)
*H04W 52/24* (2009.01)
(Continued)

(52) U.S. Cl.
CPC ........... *H04W 72/082* (2013.01); *H04W 8/24* (2013.01); *H04W 16/14* (2013.01);
(Continued)

(58) Field of Classification Search
None
See application file for complete search history.

(56) References Cited

U.S. PATENT DOCUMENTS 7,839,882 B2    11/2010 Soliman
9,173,225 B2    10/2015 Liu et al.
(Continued)

FOREIGN PATENT DOCUMENTS

WO    2014010275    1/2014
WO    2016045748    3/2016

OTHER PUBLICATIONS

Combined Search and Examination Report from the Intellectual Property Office of Great Britain for Application No. 1713950.2 dated Jan. 31, 2018 (4 pages).
(Continued)

*Primary Examiner* — Hassan A Phillips
*Assistant Examiner* — Gautam Sharma
(74) *Attorney, Agent, or Firm* — Michael Best & Friedrich LLP

(57) ABSTRACT

A method and system for assigning a frequency resource allocation to a communication device. The method includes determining a communication device model associated with the communication device. The method includes determining at least one interference emission threshold associated with a frequency range. The method includes receiving at least one communication device emission level based on at least the communication device model. The method includes determining, with a resource scheduler, a frequency resource allocation for the communication device to operate in a communication channel within the frequency range based on the at least one interference emission threshold and the at least one communication device emission level, wherein the at least one communication device emission level is not greater than the at least one interference emission threshold for the frequency range. The method further includes assigning the frequency resource allocation to the communication device.

20 Claims, 8 Drawing Sheets

(51) Int. Cl.
*H04W 8/24* (2009.01)
*H04W 16/14* (2009.01)
*H04W 72/04* (2009.01)

(52) U.S. Cl.
CPC ..... *H04W 52/243* (2013.01); *H04W 72/0473* (2013.01); *H04W 72/048* (2013.01); *H04W 72/0453* (2013.01); *H04W 72/087* (2013.01)

(56) References Cited

U.S. PATENT DOCUMENTS

| | | | |
|---|---|---|---|
| 9,370,021 B2 | 6/2016 | Love et al. | |
| 2008/0081626 A1* | 4/2008 | Choi | H04B 7/155 455/442 |
| 2009/0247201 A1* | 10/2009 | Ye | H04W 16/14 455/509 |
| 2013/0091211 A1* | 4/2013 | Diab | G06Q 50/01 709/204 |
| 2015/0119062 A1* | 4/2015 | Aoki | H04W 72/082 455/452.1 |
| 2016/0073409 A1* | 3/2016 | Chen | H04L 5/0037 370/329 |
| 2016/0081087 A1 | 3/2016 | Kwon | |

OTHER PUBLICATIONS

3GPP TS 36.101 3rd Generation Partnership Project; Technical Specification Group Radio Access Network; Evolved Universal Terrestrial Radio Access (E-UTRA); User Equipment (EU) Radio Transmission and Reception; (Release 8); technical specification (Dec. 2007).

United Kingdom (GB) Intellectual Property Office Examination Report Under Section 18(3) dated Nov. 29, 2019 for related GB Application No. GB1713950.2 (4 pages).

* cited by examiner

SYSTEM AND METHOD FOR ASSIGNING FREQUENCY RESOURCE ALLOCATION TO COMMUNICATION DEVICES

BACKGROUND

The available communication spectrum for mobile communication systems is often limited by radio technology capability and government regulations. Wireless products and services have continued to grow rapidly to the point that finite resources of available communication spectrum are being overwhelmed. Spectrum sharing, re-allocations, re-banding, and re-purposing are becoming significantly more common in several radio frequency (RF) bands. Since many radio frequency bands share spectrum with sensitive incumbent devices (for example, military radar systems, fixed satellite receivers, etc.), they often have narrowly-defined spectral masks that can be difficult to meet, and incumbent services that should be protected from harmful interference.

BRIEF DESCRIPTION OF THE SEVERAL VIEWS OF THE DRAWINGS

The accompanying figures, where like reference numerals refer to identical or functionally similar elements throughout the separate views, together with the detailed description below, is incorporated in and form part of the specification, and serve to further illustrate embodiments of concepts that include the claimed invention, and explain various principles and advantages of those embodiments.

Figure 1:
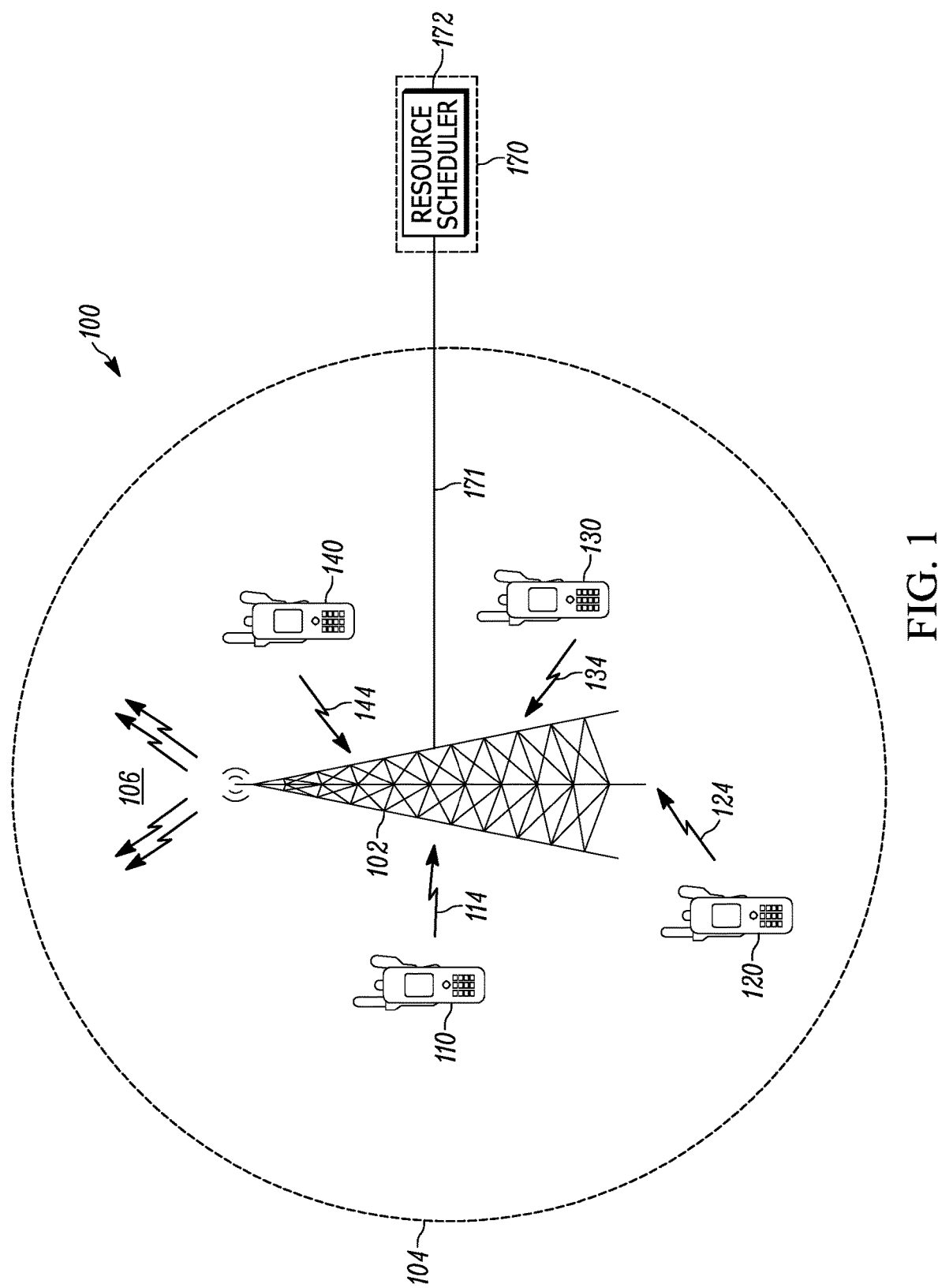
FIG. 1 is a diagram of a wireless communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In bands that are shared with other users, the required interference protection limits and transmitter spectral masks are often more stringent than what existing commercial equipment (for example, long term evolution (LTE) equipment) can provide. The required transmitter spectral masks are often even harder to comply with when utilizing wider modulation bandwidths (for example, 20 Megahertz (MHz)) due to transmitter non-linearities. Additionally, spectral masks and interference requirements often vary based on the position or channel within a particular band. This is especially pertinent in cases where multiple channels are available within a band. Accordingly, solutions for simultaneously increasing spectrum availability/access, improving system performance (for example, link range or throughput) and reducing equipment cost is highly desirable.

One exemplary embodiment provides a method of assigning a frequency resource allocation to a communication device. The method includes determining a communication device model associated with the communication device. The method also includes determining at least one interference emission threshold associated with a frequency range. The method also includes receiving at least one communication device emission level based on at least the communication device model. The method also includes determining, with a resource scheduler, a frequency resource allocation for the communication device to operate in a communication channel within the frequency range based on the at least one interference emission threshold and the at least one communication device emission level, wherein the at least one communication device emission level is not greater than the at least one interference emission threshold for the frequency range. The method also include assigning the frequency resource allocation to the communication device.

Another exemplary embodiment provides a system for assigning a frequency resource allocation to a communication device. The system comprising a resource scheduler including an electronic processor. The electronic processor configured to determine a communication device model associated with the communication device, determine an interference emission threshold associated with a frequency range, receive at least one communication device emission level based on at least the communication device model, and determine the frequency resource allocation for the communication device to operate in a communication channel within the frequency range based on the interference emission threshold and the at least one communication device emission level, wherein the at least one communication device emission level is not greater than the interference emission threshold for the frequency range.

Another exemplary embodiment provides a method of assigning a frequency resource allocation to a communication device. The method includes receiving a frequency resource allocation request from a communication device. The method also include determining whether one or more incumbent devices are located near the communication device. The method also includes determining a communication device model associated with the communication device. The method also includes determining an interference emission threshold associated with a frequency range in which the communication device operates. The method also includes receiving at least one communication device emission level based on at least the communication device model. The method also includes determining, with a resource scheduler, the frequency resource allocation for the communication device to operate in a communication channel within the frequency range based on the interference emission threshold, the at least one communication device emission level and whether one or more incumbent devices are located near the communication device, wherein the at least one communication device emission level is not greater than the interference emission threshold associated with the frequency range. The method also includes assigning the frequency resource allocation to the communication device.

FIG. 1 is a diagram of a communication system 100 in accordance with some embodiments. In some embodiments, communication system 100 includes an orthogonal frequency-division multiplexing (OFDM) communication system. It will be apparent to those skilled in the art that the communication system 100 and the components that are to be described as operating therein may take a number of forms and not solely the form illustrated. Other exemplary embodiments may include more or fewer of each of the illustrated components, may combine some components, or may include additional or alternative components. Thus, the layout of the communication system 100, and of its operational components to be described, should be regarded as illustrative rather than limiting. The communication system 100 of FIG. 1 will be described as an illustrative wireless communication system capable of operating in accordance with one or more standards, such as fourth generation (4G) LTE, IEEE 802.16 WiMax, or 802.11 WiFi-based systems. These systems may support time division duplex (TDD, for example TD-LTE) or listen before talk (LBT) techniques. Other illustrative communication systems include those that allocate some portion of the frequency resources (for example, resource blocks) within an assigned channel or band to a particular user. In general, a channel is assigned to a communication system within a frequency band using a variety of methods (for example, using a spectrum sharing database, by a regulator, or by a frequency coordinator).

The communication system 100 shown in FIG. 1 includes a base station (BS) 102 having a corresponding cell or coverage area 104 over which wireless communication services are provided to one or more communication devices 110, 120, 130, and 140 (for example, subscriber units (SUs) or user equipment (UE)). User equipment may include portable or mobile (for example, vehicular mounted) devices. The base station 102 may be operably connected to a system infrastructure 170 including a resource scheduler 172 via a wired or wireless link 171. In some embodiments, the resource scheduler 172 may include an electronic processor 173 (shown in FIG. 3) configured to assign a frequency resource allocation to each of the communication devices 110, 120, 130 and 140, according to the methods described herein. In some embodiments, the resource scheduler 172 is included within the base station 102. In alternate embodiments, the resource scheduler 172 is readily distributed between the base station 102 and the system infrastructure 170 (for example, such as in software defined networking systems). The base station 102 may be a fixed terminal or a movable (for example, temporarily fixed or deployable) terminal.

The base station 102 may have radio links 106, 114, 124, 134, 144 with one or more of the communication devices 110, 120, 130, and 140. The resource scheduler 172 may function to allocate or assign uplink frequency resources (or UE traffic resource blocks) in accordance with embodiments disclosed herein, and may provide other functions to the base station 102 and the communication devices 110, 120, 130 and 140. In other embodiments, the resource scheduler 172 may alternatively or in addition assign downlink frequency resources. In general, the base station 102 and the system infrastructure 170, together is considered to be a radio access network (RAN).

The system infrastructure 170 supporting base station 102 (and perhaps other base stations), may include, in addition to a resource scheduler 172, various sub-systems (not shown) required for operation of communication system 100. Such sub-systems may include, for example, radio controllers, sub-systems providing authentication, routing, subscriber unit registration and location, system management and other operational functions within the communication system 100, some of which may be provided by the resource scheduler 172. The system infrastructure 170 may additionally provide routes to other base stations (not shown) providing radio sites serving other subscriber devices, and/or may provide access to other types of networks such as a plain old telephone system (POTS) network (not shown) or a data-switched wide area network such as the Internet. Some examples of base station interfaces in 4G LTE networks include X2, S1, S5, S6, S10 and S11 interfaces in 4G LTE networks. In some embodiments, the base station 102 may include the resource scheduler 172. In other embodiments, the functions performed by the resource scheduler 172 may be distributed between the base station 102 and the system infrastructure 170. The resource scheduler 172 is configured to assign communication frequency resources such as starting resource block position, resource block allocation (or size), and optionally additional maximum power reduction (AMPR) based on interference levels (for example, out-of-band emission (OOBE) requirements for the frequency band 201 (in FIG. 2) or tolerable incumbent device interference), and ensures that the communication devices 110, 120, 130 and 140 can successfully operate in the frequency band 201 (in FIG. 2) without causing undue interference. In some embodiments, the resource scheduler 172 is configured to schedule the resource block allocations (as described below) in order to meet all transmit spectral mask and interference requirements for the frequency band 201 (in FIG. 2). This capability is critical to protecting other users or incumbents in the band from interference.

Figure 2:
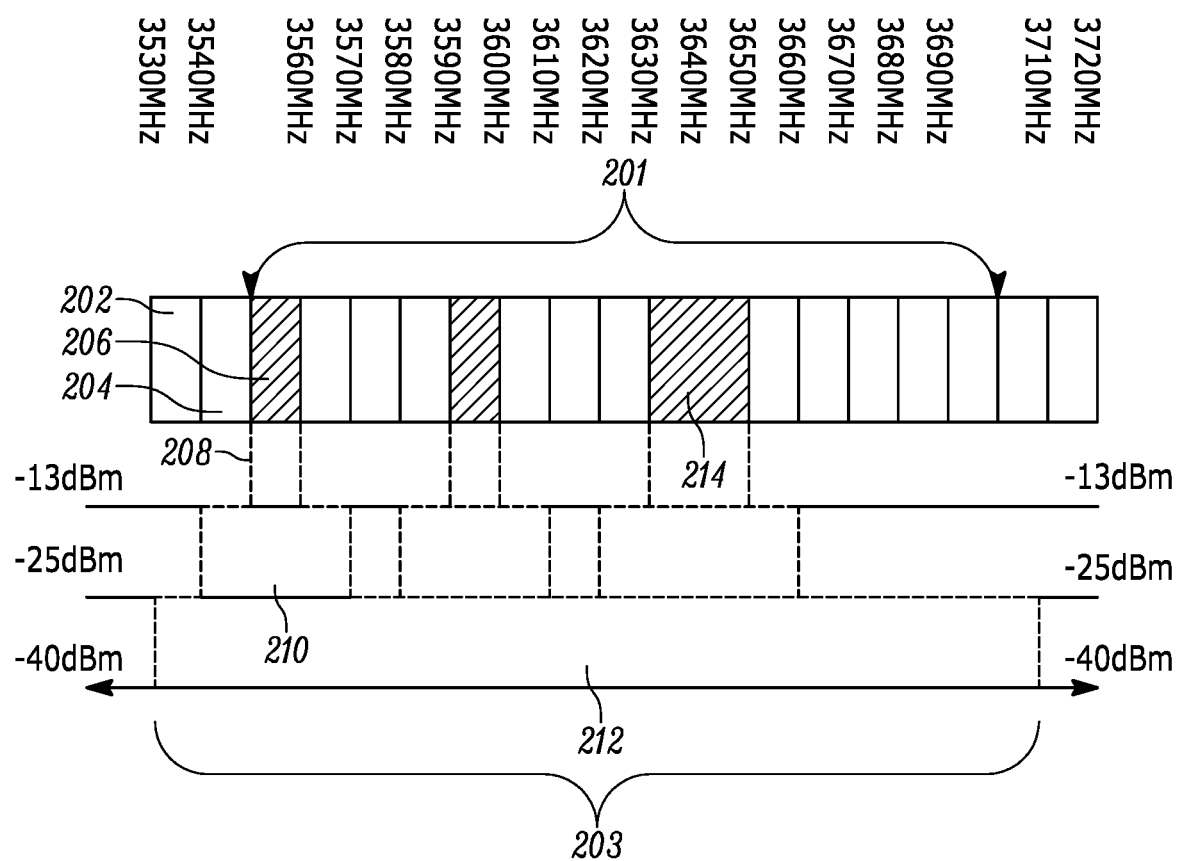
FIG. 2 illustrates a sample transmitter spectral mask requirement for communication devices operating in 3.5 Gigahertz (GHz) band in the U.S.

FIG. 2 illustrates a transmitter spectral mask requirement for communication devices operating in the 3.5 GHz (for example, from 3550 MHz to 3700 MHz) band in the U.S. Note that the frequency limits of this band may be expanded in the future. The spectral mask is given in terms of absolute levels of conducted power levels, similar to other cellular bands. Channels 202, 204, 206 in the frequency band 201 are nominally 10 MHz wide, but can be aggregated to form higher bandwidth channels 214 (for example, into a 20 MHz time division long term evolution (TD-LTE) carrier, a 40 MHz carrier, etc.). In the first 10 MHz outside of the occupied channel, conducted emissions are specified to be no more than a −13 decibel-milliwatt (dBm)/Megahertz (MHz) level 208. Outside of 10 MHz beyond the occupied channel edge, emissions should fall to a −25 dBm/MHz level 210. In addition, for 20 MHz outside of the 3.5 GHz frequency band 201 (below 3530 MHz and above 3720 MHz), emissions are required to fall to a −40 dBm/MHz limit 212, in order to protect incumbent devices (such as C-band satellite receivers). Each of these transmitter spectral mask levels (shelves or out-of-band emission levels) should not be exceeded by any devices operating in the communication system 100. In effect, the transmitter spectral mask levels represent a maximum interference level (at a particular frequency) that a particular communication device is allowed to generate. The frequency range 203 over which out-of-band emission levels are considered is often much larger than the operating channel or frequency band 201 in which the communication system 100 operates (as in the example above). These types of spectral masks are very common in communication bands. In general, the transmitter spectral mask will be more difficult to meet with wider user equipment frequency resource (for example, resource block) allocations, or wider (maximum system) modulation bandwidths (as described below). In this example, there are a total of fifteen 10 MHz channels available in the 3.5 GHz band.

When, for example, 4G LTE standard network signaled mask (for example, NS_22) is applied in $3^{rd}$ generation partnership project (3GPP) bands 42 and 43, additional maximum power reduction (AMPR) may be necessary to meet the above 3.5 GHz spectral mask. In some cases, this additional maximum power reduction amount may exceed several decibels. While increasing the amount of additional maximum power reduction may meet the requirements of the mask, the resulting uplink transmit power reduction reduces the uplink range and throughput (which may be the weakest link in most link budgets, and limit overall system range or usability). Thus, it is desirable to limit the amount of additional maximum power reduction that is utilized in the system.

One characteristic of the 3.5 GHz band is that the strictest −40 dBm/MHz limit 212 only applies 20 MHz outside of the 3550-3700 MHz band. When operating on the lowest channel 206, one may limit the maximum resource block allocation to 60 resource blocks (for example, out of 100 available resource blocks) when scheduling at the low-end of the channel in order to meet emissions limits (specified above, for example, for the lowest channels starting at 3550 MHz, with a 20 MHz or wider modulation bandwidth). Emissions limits (or interference emission thresholds) should generally be met to satisfy regulations and/or protect other users from interference. Larger allocations beginning at a higher starting resource block position may be supported if out-of-band emissions are carefully managed (as described below). In all cases, the situation applies in an approximately symmetric fashion when using the highest channels (for example, 3680-3700 MHz, 3660-3700 MHz, etc.). These limits become more restrictive when employing larger carrier bandwidths (for example, 40 MHz), and may require the resource scheduler 172 to utilize channel aware techniques (described herein) even on more interior channels in the band (for example, 3650-3690 MHz). In general, the closer the assigned channel is to the edge of the band (where out-of-band emission requirements may be stricter), and the wider the modulation bandwidth, the more likely that frequency resource allocation will need to be limited in size and starting position. Thus, the resource scheduler 172 can be made aware of the channel assignment within the band to better manage frequency resource allocations. These techniques may not be needed when the communication devices 110, 120, 130 and 140 are assigned to more central channels in the middle of the band and utilize smaller frequency resource allocations. Note that larger or wider frequency resource allocations (regardless of actual channel assignment) may also exceed some of the closer in out-of-band emission limits (or shelves) of the transmitter spectral mask (for example, the −25 dBm/MHz or −13 dBm/MHz levels described in the example above). In cases where the size of the resource block allocation is limited, the resource scheduler 172 may trade-off time resources (increase the number of transmit time interval (TTI) allocations) to help compensate for these effects. In general in orthogonal frequency-division multiplexing systems, communication resources may be spread over either the frequency or time domains.

In some embodiments, larger frequency or resource block allocations may be provided by subsequently shifting the resource blocks to higher (or lower) starting resource block positions in order to meet the mask or other out-of-band emission interference limits (depending on the exact channel assignment within the band). Shifting the resource block allocations to higher (or lower) starting resource block positions is also a function of each communication devices' actual out-of-band emission performance level (which may vary by communication device model, operating temperature, frequency, etc.), and any additional maximum power reduction that is utilized. In some embodiments, communication device's out-of-band emissions data (and any corresponding additional maximum power reductions) may be determined at the device manufacturing time or may be accurately measured or predicted, and stored in a look-up table or database for each particular device model. For example, a seventy resource block allocation (in a 20 MHz TD-LTE system) could be allowed (with only 1 decibel additional maximum power reduction) by shifting the starting resource block allocation to the thirtieth resource block position (out of a possible 100 resource block positions). In this manner, the 3.5 GHz spectral masks can be met with existing equipment. The resource scheduler 172 is then free to allocate the unused resources (for example, resource blocks 1-30, near the edge of the channel) to other communication devices that need less communication resources (for example, lower data rates), since smaller resource block allocations will more likely meet the out-of-band emissions requirements even if scheduled near the channel edge due to lower out-of-band emission. With higher additional maximum power reduction, even larger resource block allocations can be accommodated by shifting the allocation lower (in this example). Higher additional maximum power reduction (for example, 3 decibels) may be tolerable in some cases if the communication device 110, 120, 130, 140 is not near the cell edge or edge of the coverage area 104, which can also be accommodated by the methods provided below using geo-location. Geo-location data received from the communication devices 110, 120, 130 and 140 (for example, global positioning system (GPS) data, and/or power control data, for example, long term evolution power head room (PHR) data) may be utilized to help determine communication device position within the coverage area 104 (for example, whether the communication device 110, 120, 130, 140 is indoors) for these and related cases. Communication device position is also helpful in controlling or limiting interference in other cases (described below).

Figure 3:
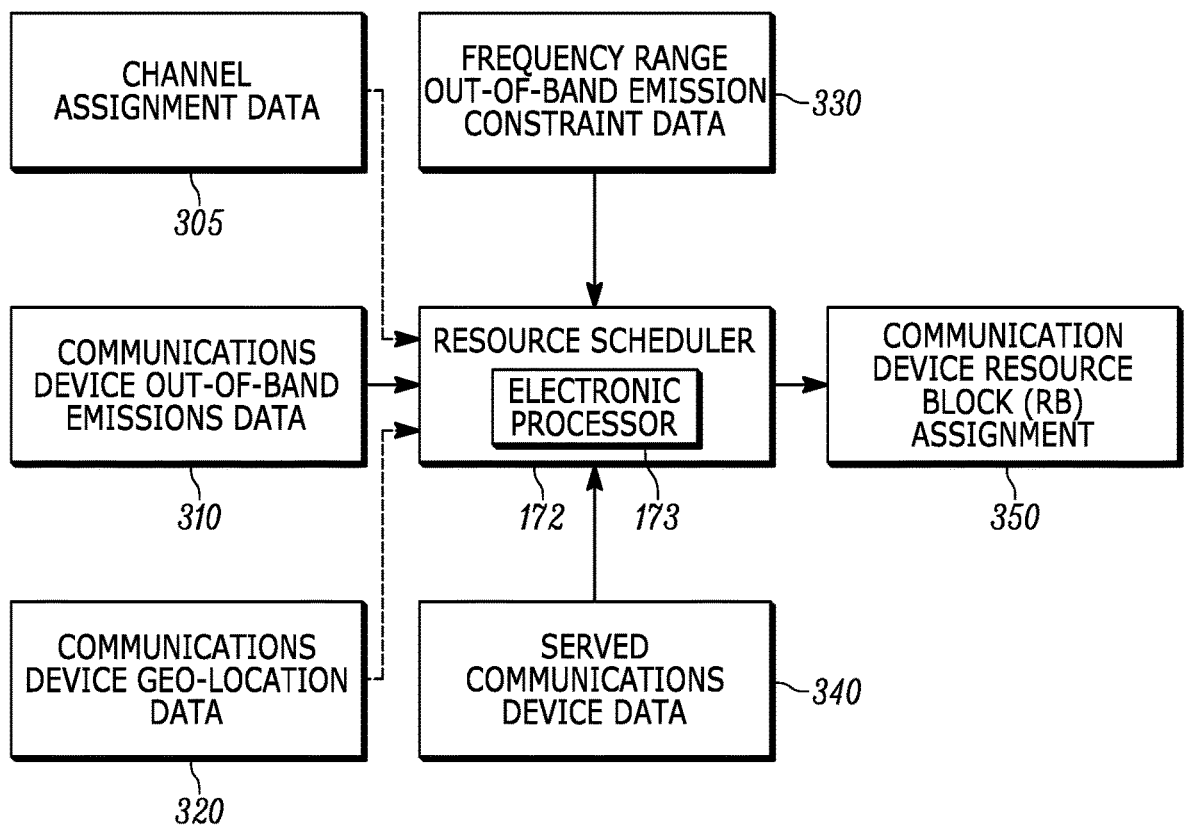
FIG. 3 is a block diagram of input/output data flow associated with a resource scheduler in accordance with some embodiments.

FIG. 3 is a block diagram showing the input/output data flow associated with the resource scheduler 172 in accordance with some embodiments. The resource scheduler 172 is configured to receive communication device related out-of-band emissions data 310 that may be stored in a database. The communication device's related out-of-band emission data may be stored for a variety of user equipment types or models that are utilized in the communication system 100. The resource scheduler 172 is also configured to optionally receive geo-location data 320 of the communication devices 110, 120, 130, 140, which can be utilized to aid user equipment frequency resource allocation assignments. The resource scheduler 172 is also configured to receive out-ofband emission constraint data 330 for at least one frequency range 203 (FIG. 2) that may be stored in a database. The out-of-band emission constraint data is generally specified for multiple frequency ranges (on a relative or absolute basis), and is often determined by regulators, or the proximity of communication devices 110, 120, 130, 140 to incumbents or other users. Differing types of communication devices 110, 120, 130, 140 generally have different levels of interference tolerance (or tolerable emissions constraint data), as described below. The resource scheduler 172 is also configured to receive communication device data 340 associated with the communication devices that are being served. The communication device data 340 may contain communication device identifying information (for example, user equipment model number or international mobile subscriber identity (IMSI) data, for linking back to the communication device related out-of-band emission data 310), connection quality of service (QoS) information for each connection or bearer, power head room information, channel quality information (CQI), and/or signal to interference plus noise ratio (SINR) information. In addition, the resource scheduler 172 may be configured to receive a channel assignment data 305 within the operating band. The channel assignment data 305 may be determined by a geo-location spectrum database (for example, a spectrum access system (SAS)), or a spectrum sharing database. In some embodiments, the channel assignment data 305 may be assigned by a regulator or other authority (for example, a frequency coordinator). The resource scheduler 172 is configured to determine and generate a communication device resource block assignment 350 for the communication device.

Figure 4:
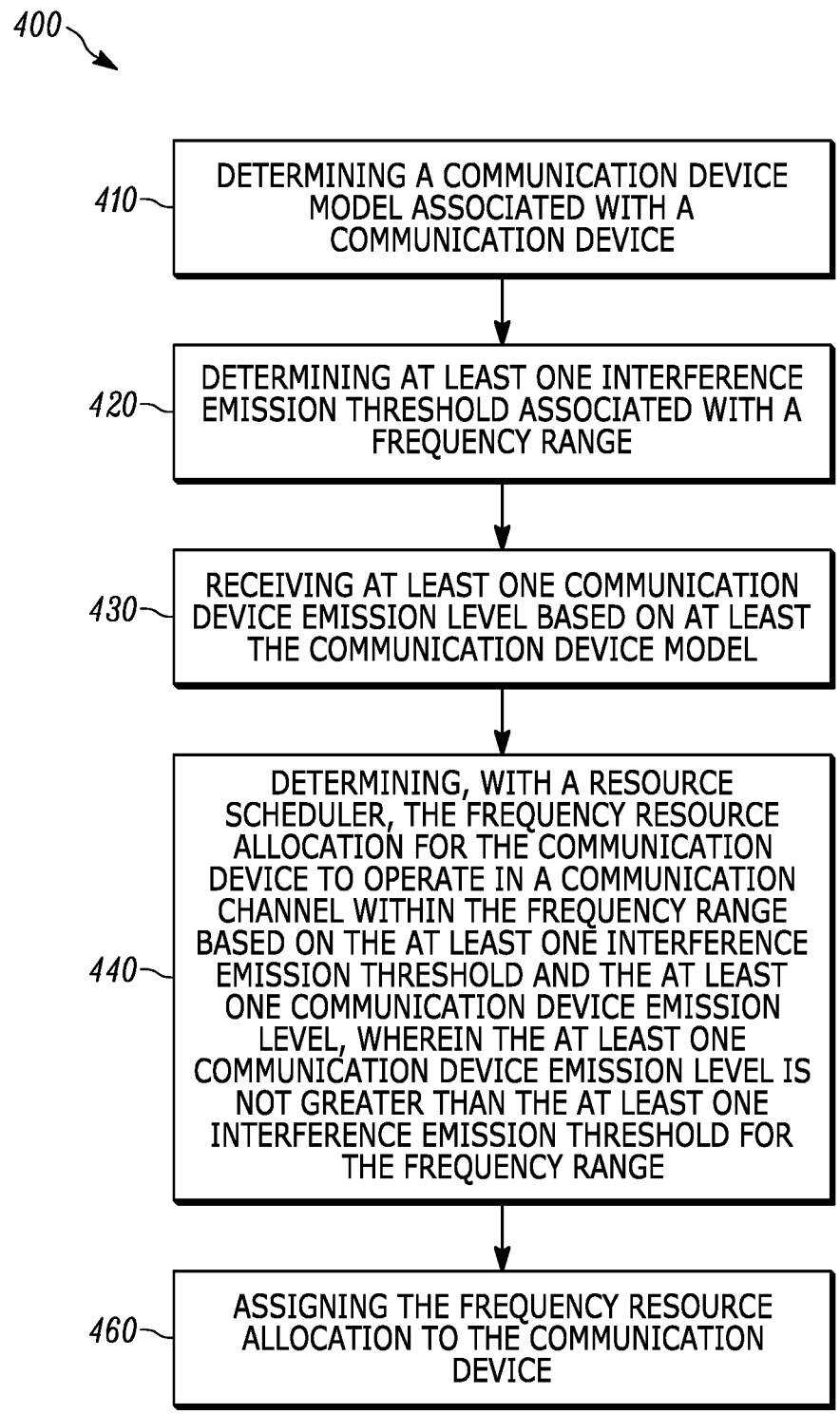
FIG. 4 is a flow chart of a method of assigning a frequency resource allocation to a communication device operating within a communication channel in accordance with some embodiments.

FIG. 4 is a flow chart of a method 400 of assigning a frequency resource allocation to a communication device (for example, one of the communication devices 110, 120, 130 and 140) operating within a communication channel using a resource scheduler 172 in accordance with some embodiments. At block 410, the method 400 includes determining a communication device model associated with the communication device 110, 120, 130, 140. In some embodiments, the data associated with the communication device model also includes a communication device type. At block 420, the method 400 includes determining at least one interference emission threshold associated with a frequency range 203 (FIG. 2). In some embodiments, at block 420, the method 400 includes determining the at least one emission threshold associated with the frequency range 203 (FIG. 2) includes receiving the interference emission threshold from a database having one or more frequency ranges and incumbent device (for example, 708 in FIG. 7) model identifiers stored in a database.

At block 430, the method 400 includes receiving at least one communication device emission level based on at least the communication device model. This information is typically accessed in a device-specific out-of-band emission database for a variety of resource block starting positions and sizes (in the next step). In some embodiments, receiving the at least one communication device emission level in block 430 includes accessing a database having a plurality of communication device emission levels, wherein each of the plurality of communication device emission levels is associated with at least one frequency resource allocation. At block 440, the method 400 includes determining, with a resource scheduler 172, a resource allocation for the communication device to operate in a communication channel within the frequency range 203 (FIG. 2) based on the at least one interference emission threshold and the at least one communication device emission level, wherein the at least one communication device emission level is not greater than the at least one interference emission threshold for the frequency range 203 (FIG. 2).

In some embodiments, at block 440, the method 400 includes determining the frequency resource allocation based on a quality of service of a connection between the communication device 110, 120, 130, 140 and a base station 102. In some embodiments, at block 440, determining, with the resource scheduler 172, the frequency resource allocation for the communication device 110, 120, 130, 140 is further based on a location of the communication device 110, 120, 130, 140, wherein the location of the communication device 110, 120, 130, 140 is stored in a spectrum sharing geo-location database. In some embodiments, at block 440, the method 400 includes determining, with the resource scheduler 172, the frequency resource allocation for the communication device 110, 120, 130, 140 to operate in the communication channel is further based on a location associated with an incumbent device 708 (in FIG. 7). In some embodiments, at block 440, the method 400 includes determining, with the resource scheduler 172, the frequency resource allocation for the communication device 110, 120, 130, 140 to operate in the communication channel is further based on a distance between a communication device 706 (in FIG. 7) and an incumbent device 708 (in FIG. 7). In some embodiments, at block 440, the method 400 includes determining, with the resource scheduler 172, the frequency resource allocation further based on a distance between the communication device 110, 120, 130, 140 and a base station 102.

At block 460, the method 400 includes assigning the frequency resource allocation to the communication device 110, 120, 130, 140. In some embodiments, at block 460, the resource scheduler 172 may assign a frequency resource allocation (resource block allocation size and starting position) that meets the band specific out-of-band emission or (incumbent specific) interference requirements, while simultaneously maximizing connection throughput (or reducing connection latency).

In some embodiments, the method 400 further includes determining a transmit power level reduction for the communication device 110, 120, 130, 140 to operate in the communication channel.

In some embodiments, the resource scheduler 172 receives specific communication device limitations or data (such as device model number, connection QoS level, latency requirements, geo-location data, power head room data, channel quality information, signal to interference plus noise ratio data, etc.) and uses the received communication device limitations information to manipulate the resource block allocations (and any additional maximum power reduction, if desired) to ensure that a spectral mask or interference constraint is met. Note that a single UE (for example, 110, 120, 130 or 140) may have multiple active connections or bearers, each with their own quality of service (QoS) level or latency requirements. In cases where specific communication device model data may not be available (for example, in the database associated with 310), the resource scheduler 172 can assume the communication device meets an existing spectral mask specified for the particular band (for example, third generation partnership project (3GPP) band 42 mask for the 3.4-3.6 GHz band), and will require specialized scheduling to (as described above) meet the out-of-band emissions requirements for another band (for example, 3GPP band 47). The out-of-band emissions can be controlled (and the spectral mask can be met)

by limiting resource block allocations and (starting or ending) resource block position at the ends of the band (that is, during communication device or user equipment operation near the edges of the band), especially when wider modulation bandwidths (for example, 20 MHz or greater) are utilized. This applies whenever the communication device's out-of-band emissions are predicted to be outside (or above) the required mask level, and could occur in either the lower or upper assigned channels in the 3550-3700 MHz band.

In some cases, the resource scheduler 172 might need to break up large transport blocks (for example, those >70-100 resource blocks for a 20 MHz long term evolution system) into smaller transport blocks (per transmit time interval (TTI)) in order to meet the required spectral mask (since smaller resource block allocations typically have lower out-of-band emissions), or move the resource block allocation further away from the channel edge (as illustrated in the seventy resource block example above). This resource scheduler 172 look-up table approach can also be adapted to different modulation bandwidths (for example, 10 MHz, 20 MHz, 40 MHz, etc.) to account for the different intermodulation (IM) characteristics of the transmitted waveform (since the widths of the spectral shelves of the modulation are typically proportional to the occupied bandwidth of the frequency or resource allocation). The transmit out-of-band emission characteristics for a wide range of resource block allocations for each device model typically utilized in the system are stored in a database as communication device's out-of-band data 310 and used by the resource scheduler 172 to help meet the transmit spectral mask, as described above. This approach has an advantage that equipment with better out-of-band emission performance is rewarded with better scheduling/throughput, since it can be granted wider frequency resource allocations while still meeting out-of-band emission constraints.

As mentioned above, depending on the quality of service levels for a long term evolution bearer, one can trade off additional maximum power reduction versus resource block allocation limits to meet the mask. For example, for high signal to interference plus noise ratio (SINR) channels (or high channel quality information or power head room channels), a higher additional maximum power reduction may only modestly affect achievable throughput (for example, result in a small reduction in spectral efficiency due to a limited adaptive modulation coding set (MCS) reduction), which may be tolerable to less sensitive applications. In other cases, where the signal to interference plus noise ratio or channel quality information (or power head room) is low (for example, the link is near maximum operating range), the resource scheduler 172 may not apply any further additional maximum power reduction (AMPR), but instead use the resource allocation shifting or splitting techniques described above.

In some embodiments, the frequency resource allocation may vary based on the position of the channel within the frequency band 201 (for example, within the 3550-3700 MHz band), since a channel towards the middle of the band (for example, 3620 MHz) may not typically be subject to (or concerned with) the −40 dBm/MHz mask limits due to greater spectral separation (even for wider modulation bandwidths), though it may still require resource assignment modification to meet other portions of the mask (for example, the −25 dBm/MHz or −13 dBm/MHz limit). In some shared spectrum systems, channels may be assigned and controlled by a geo-location database or spectrum access system, without regard to device out-of-band emission levels.

Figure 5:
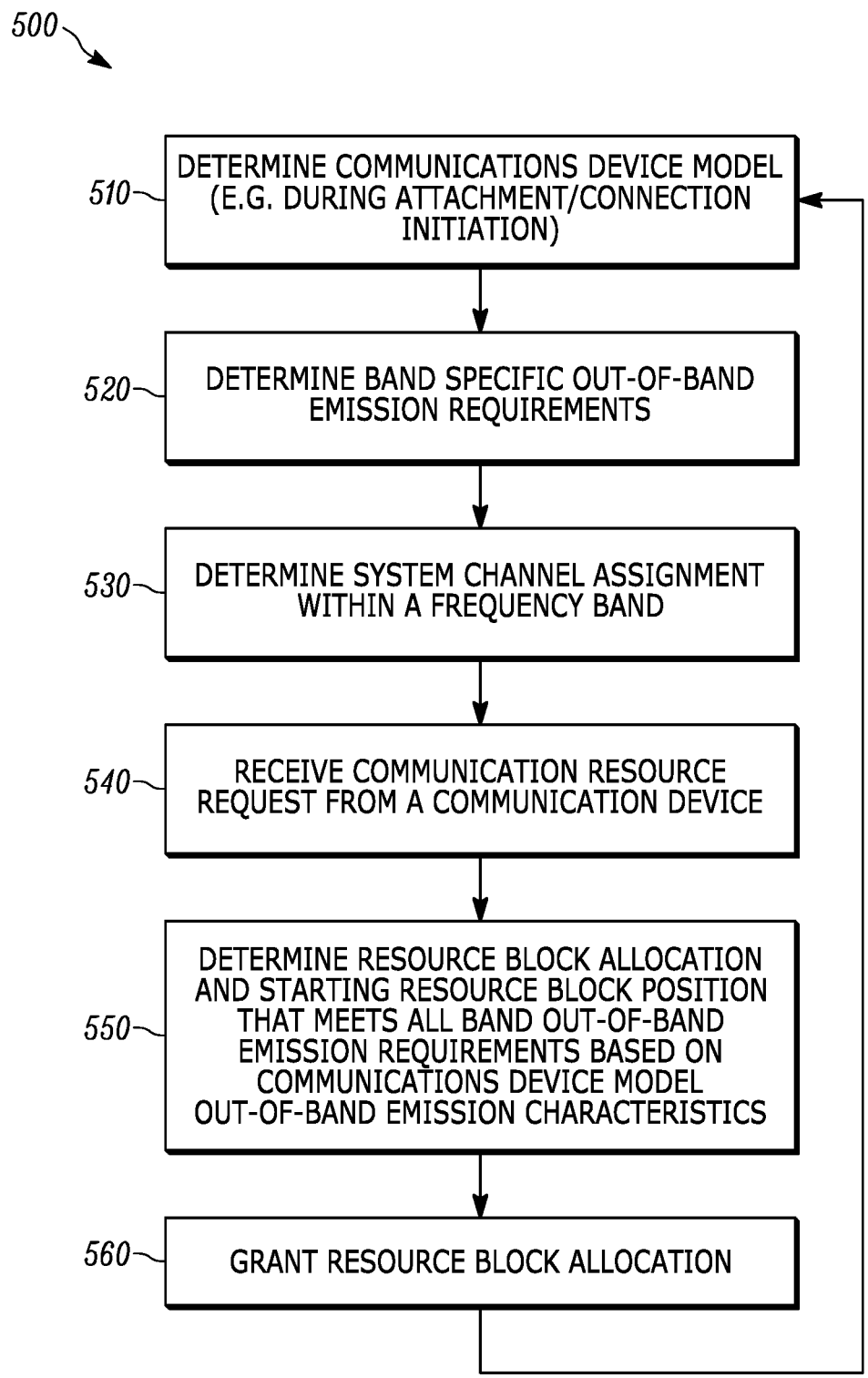
FIG. 5 is a flow chart of a method of operation of a resource scheduler in accordance with some embodiments.

FIG. 5 is a flow chart illustrating a method 500 of operation of a resource scheduler 172 in accordance with some embodiments. At block 510, the resource scheduler 172 determines a communication device model during an attachment or connection initiation procedure of a communication device 110, 120, 130, 140 with the base station 102. At block 520, the resource scheduler 172 determines band specific out-of-band emission (or interference) requirements. At block 530, the resource scheduler 172 determines the system channel assignment within a frequency band 201. At block 540, the resource scheduler 172 receives communication resource request from a communication device 110, 120, 130, 140. In some embodiments, the resource scheduler 172 accesses the communication device's out-of-band emission performance data based on the communication device model (for example, using the specific communication device model at connection set-up/attachment) to determine device out-of-band emission levels (or upper limits) for various resource block allocations/combinations. At block 550, the resource scheduler 172 determines the resource block allocation (or size) and the starting resource block position that meets all out-of-band emission requirements based on the communication device model out-of-band emission characteristics. At block 560, the resource scheduler 172 grants resource block allocations to the user equipment. After granting resource block allocation to the communication device 110, 120, 130, 140, the method 500 continues to block 560 to determine a communication device model for the next communication device 110, 120, 130, 140. Note that the above steps (including, but not limited to 530-560) may be performed for each resource allocation request made by a particular communication device 110, 120, 130, 140. For example, if the channel assignment changes between communication resource requests, the resource block allocation may also change to meet the new out-of-band emission requirements, as described above.

Taken together with band-specific out-of-band emission or interference limits information (such as the transmit spectral mask for the 3.5 GHz band specified above), and the actual channel assignment within the band for the system (for example, from a spectrum sharing geo-location database), the resource scheduler 172 can grant resource block allocations using the methods described herein (for example, shifting starting resource block positions away from band edges for larger resource block allocations, applying additional maximum power reduction, and/or splitting up-link allocations into smaller blocks depending on connection quality of service/latency characteristics) in order to meet all out out-of-band emission requirements. This type of resource block allocation can be implemented in higher layer scheduling software at the base station 102 or deployed in another infrastructure device (for example, as provided in software defined networking). In addition, resource block allocation techniques like those described can be employed in long term evolution base stations can be made to work with existing $3^{rd}$ generation partnership project user equipment (UE). Additionally, implementing the described techniques may also enable communication devices to operate over larger areas (for example, portions of a cell or coverage area), as described further below.

Figure 6:
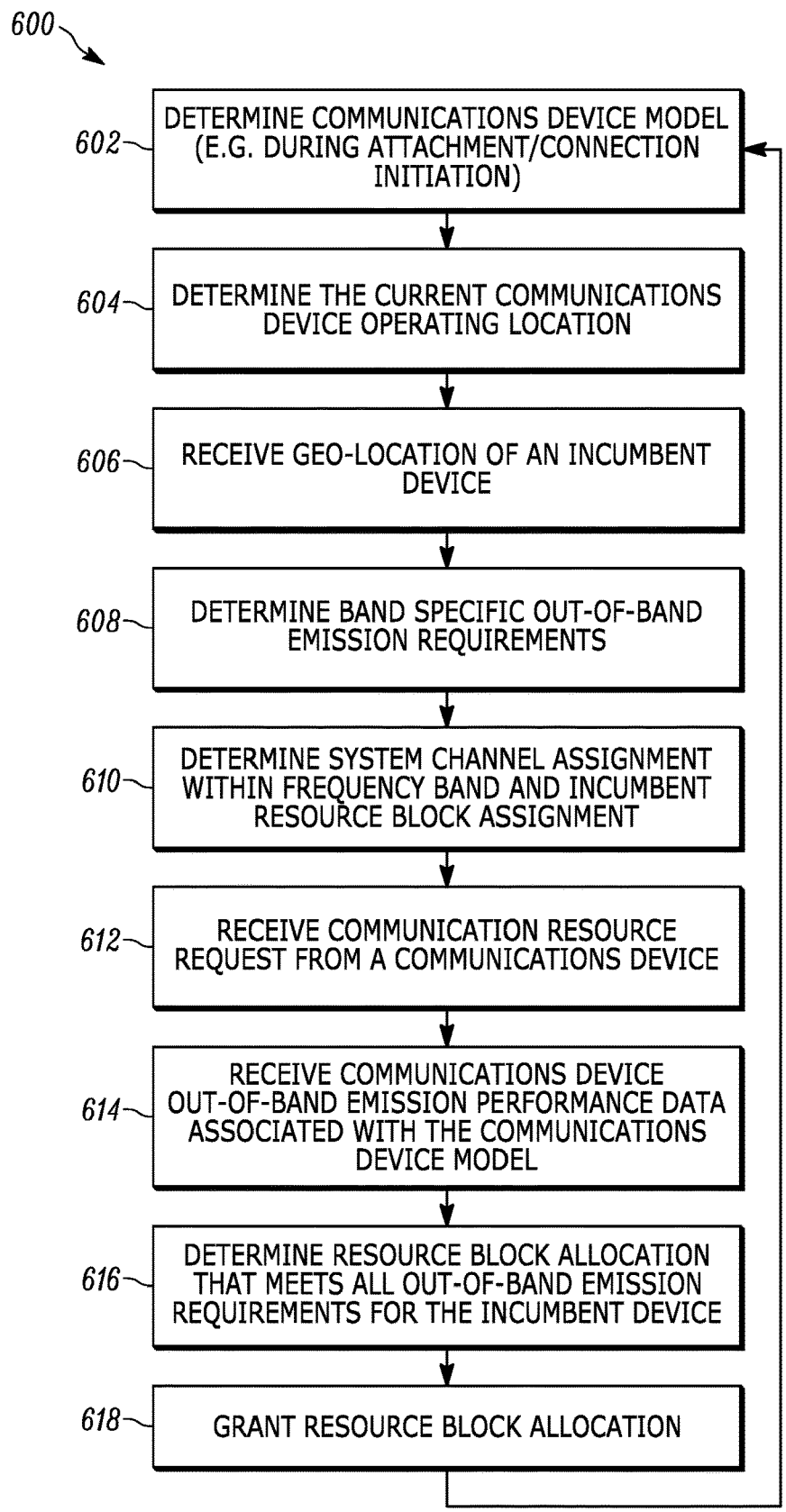
FIG. 6 is a flow chart of a method of protecting an incumbent from interference caused by at least one communication device in accordance with some embodiments.

FIG. 6 is a flow chart of a method 600 of protecting an incumbent or other spectrum user from interference caused by at least one communication device (for example, communication device 110, 120, 130, and 140) in some embodiments. The principles involved are similar to meeting a particular out-of-band emission spectral mask for a given band. In this case, the incumbent receiver (or other spectrum user) should be protected from interference. In general, this can be achieved by specifying the maximum allowable emissions into the incumbent receiver, which effectively looks like a maximum out-of-band emission constraint (or interference emission threshold, as described above).

In some cases, the incumbent receiver may only occupy a portion of the band or channel (such as a weather satellite receiver that utilizes a 2 MHz portion of a 10 MHz LTE channel). The incumbent device 708 (in FIG. 7) should in general be protected from both in-band and out-of-band interference (relative to the incumbent receiver pass-band). Though the steps in FIG. 6 are shown in a particular order, many of the steps (for example, 604-614) may be performed in an arbitrary order, and many different implementations are possible. At block 602, the resource scheduler 172 determines the user equipment model during the attachment or connection initiation procedure of the user equipment with the base station 102. At block 604, the resource scheduler 172 determines the current communication device operating location. In some embodiments, this step may be performed multiple times (for example, for each communication resource request received from a communication device) if the communication device is mobile or moving around. At block 606, the resource scheduler 172 receives the geo-location information of an incumbent device 708 (for example, a weather satellite receiver). This type of information is typically stored in an incumbent geo-location database, as described below. Though the term 'incumbent' is utilized here, it may refer to any other spectrum user that needs protection from interference. At block 608, the resource scheduler 172 determines band specific out-of-band emission requirements, or interference protection requirements for the other spectrum users. These requirements may also be stored in the incumbent geo-location database, and they can be associated with each type of incumbent device 708 or other spectrum user. The requirements in general represent a maximum allowed interference level, typically specified at several frequencies (for example, within an incumbent receiver pass-band, on an adjacent frequency, on an alternate frequency, etc.). At block 610, the resource scheduler 172 determines a channel assignment within a frequency band 201 (in FIG. 2) and any incumbent device resource block (or channel) assignments of concern (for example, used for determining incumbent receiver interference limits on co-, adjacent and alternate channels or resource blocks). The maximum allowed interference levels may be reduced by any estimated path loss between the communication device (for example, user equipment) and the incumbent device 708, such that higher user equipment out-of-band emissions or interference may be tolerable at greater distances between the communication device and incumbent. Any variety of path loss estimators or models (for example, Egli, terrain-based Longley-Rice model, Hata model, European cooperation in the field of Scientific and Technical Research model (COST-231), etc.) may be utilized to compute the reduction in received interference at incumbent device location (relative to the emitted levels at the communication device). In general, the antenna gains of both the user equipment and victim receiver (incumbent or other user) are taken into account in these path loss computations.

At block 612, the resource scheduler 172 receives a communication resource request from the communication device 110, 120, 130, 140. At block 614, the resource scheduler 172 determines an out-of-band emissions level associated with the particular model of user equipment, which is often stored in a pre-configured database, as described above. At block 616, the resource scheduler 172 determines a resource block allocation that meets all out-of-band emission or interference requirements for the incumbent device 708, which may incorporate co-channel, adjacent channel, or alternate channel interference protection ratios for the incumbent receiver. These interference protection ratios may also be termed desired to undesired interference (D/U) ratios in the art, and depend on desired signal levels and the communication device transmit power level (for example, determined by the user equipment model number and power head room values), using link budget computational methods known to those skilled in the art. In some cases, these interference protection requirements may alternately be specified in terms of absolute interfering signal levels (for example, as in receiver blocking requirements, which typically specify a maximum tolerable interference level, as opposed to a level relative to the desired signal). As mentioned, link budget computational methods (incorporating path loss models) in general should take into account any spatial effects (for example, gain or three-dimensional pattern) of both the transmitter and receiver antennas, to ensure that maximum interference levels are not exceeded at the incumbent receiver location. At block 618, the resource scheduler 172 is configured to grant resource block allocation to the user equipment which ensures that at least one incumbent interference limit is not exceeded. After granting resource block allocation to the user equipment, the method 600 continues to block 602 to determine a user equipment model for the next communication device, or the same device operating at a different location. Once again, these steps may be repeatedly performed (and partially re-ordered) for multiple communication resource requests from the communication device 110, 120, 130, 140.

Figure 7:
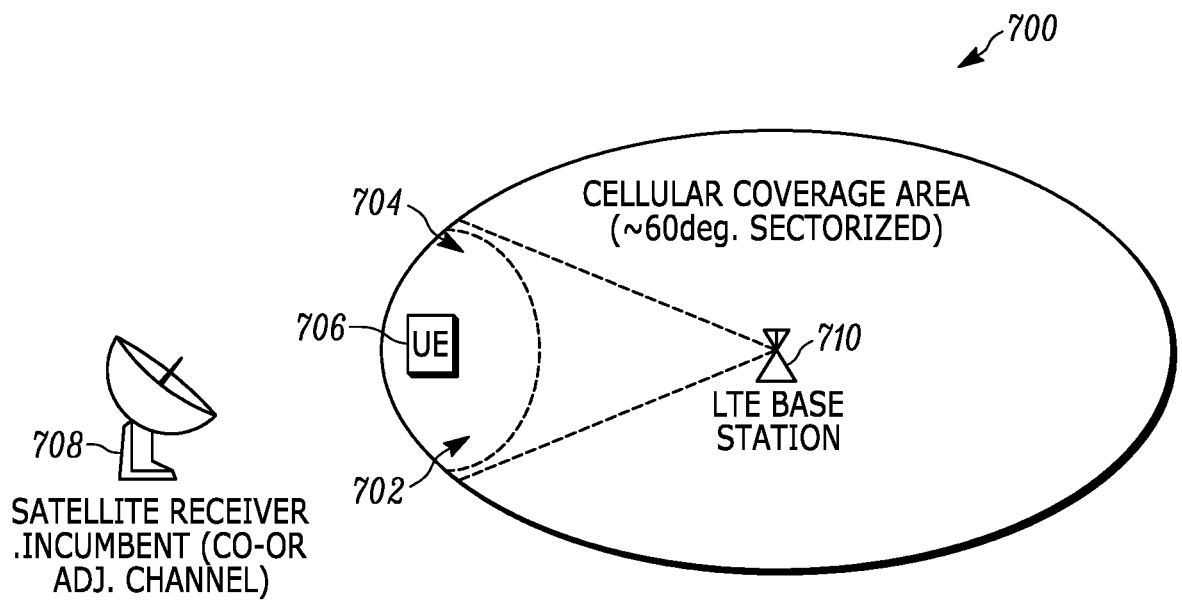
FIG. 7 illustrates the region in a cellular coverage area where resource scheduling may be applied to avoid incumbent interference, in accordance with some embodiments.

FIG. 7 illustrates the regions in a cellular coverage area 104 where the above described resource scheduling may be applied to avoid incumbent interference, in accordance with some embodiments. As described herein, having geo-location information from communication devices can provide significant benefits to the communication system 100, especially in terms of improving access to shared spectrum. For example, the resource scheduler 172 can know when the communication device 706 (for example, a user equipment) is near the cell/sector edge (for example, in region 702-704 in FIG. 7) of cell coverage of a base station 710, which can be crucial in incumbent device 708 (for example, a satellite receiver) protection. For example, in the AWS-3 band (1695-1710 MHz), cellular operators should share spectrum with weather satellite receivers operating in narrow co-channel portions of the band (for example, with less than 1.5 MHz receiver bandwidths). The channel assignment and location aware resource scheduler 172 in this case can be aware that a communication device is near the cell edge (near a co-channel satellite receiver site in this case, since co-channel keep-out zones are typically employed around satellite receivers—see FIG. 7), and adjust the scheduling accordingly to avoid scheduling resource blocks around that satellite receiver's operational band, for that specific communication device.

Figure 8:
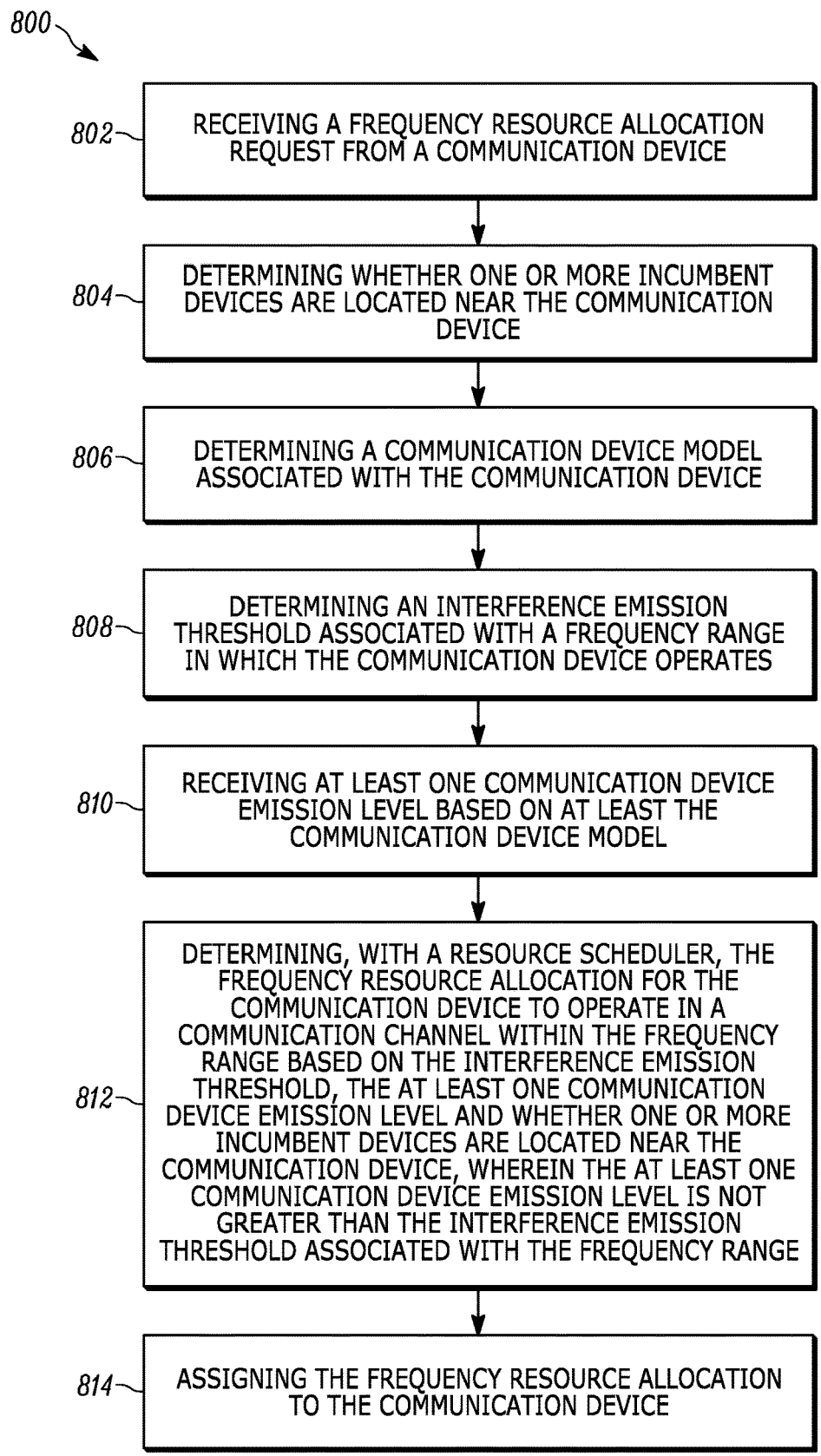
FIG. 8 illustrates a flow chart of a method of assigning a frequency resource allocation to a communication device in accordance with some embodiments.

FIG. 8 illustrates a flow chart of a method 800 of assigning a frequency resource allocation to a communication device 706 in accordance with some embodiments. At block 802, the method 800 includes receiving a frequency resource allocation request from a communication device 706. At block 804, the method 800 includes determining whether one or more incumbent devices 708 are located near the communication device 706. At block 806, the method 800 includes determining a communication device model associated with the communication device 706. At block 808, the method 800 includes determining at least one interference emission threshold associated with a frequency range 203 (FIG. 2) in which the communication device 706 operates. In some embodiments, at block 808, the method 800 includes determining the interference emission threshold associated with a frequency range 203 includes receiving the interference emission threshold from a database having one or more frequency ranges and incumbent device model identifiers stored in the database.

At block 810, the method 800 includes receiving at least one communication device emission level based on at least the communication device model. At block 812, the method 800 includes determining, with a resource scheduler 172, a frequency resource allocation for the communication device 706 to operate in a communication channel within the frequency range 203 (FIG. 2) based on the interference emission threshold, the at least one communication device emission level and whether one or more incumbent devices 708 are located near the communication device 706, and wherein the at least one communication device emission level is not greater than the interference emission threshold associated with the frequency range 203 (FIG. 2). At block 814, the method 800 includes assigning the frequency resource allocation to the communication device 706.

The above described methods have the net effect of greatly reducing the required co-channel or adjacent channel keep-out zones around these spectrum incumbents, since communication device interference can be greatly reduced by judicious frequency resource allocation (for example, resource block) scheduling. Note that such protection may also take into account the time of day (for example, for tracking satellite receivers/dishes, as are typical in the band), since the pointing angle (and hence the receive antenna pattern) changes over time, and is typically predictable based on the time of day. As described above, one embodiment of the resource scheduling algorithm takes into account both communication device position (and optionally user equipment power head room or transmission power level), time of day, and out-of-band emission or interference requirements for other (for example, incumbent) spectrum users. Thus, the resource scheduler 172 can effectively control electromagnetic interference into the incumbent spectrum users in the frequency band 201 (FIG. 2) by judicial resource block allocation, taking into account the distance (and the propagation path) between the user equipment and an incumbent receiver.

The methods provided herein may also be employed in cellular systems in the AWS-3 band (for example, 1695-1710 MHz) or other frequency bands (for example, 600 MHz, 3.5 GHz) where certain incumbent devices (for example, 708 in FIG. 7) or other users that need spectral/interference protection reside. In these cellular systems, a communication device may be operating towards the edge of a cell/sector, in relatively close proximity (for example, within 150 km) to a protected incumbent device (for example 708 in FIG. 7). The incumbent device 708 needing special interference protection could be a co-channel weather satellite receiver site in the AWS-3 band, as is typical, or it may be adjacent channel incumbents (for example, C-band satellite receivers in the 3.7 GHz band). Since incumbent devices (for example 708) are often fixed in nature, and communication device location can be determined via a wide variety of available means (for example, global positioning, WIFI network-based, or network assisted methods), the resource scheduler 172 can determine when a communication device is operating in close proximity to the incumbent device (for example, the satellite receiver 708 in FIG. 7), and adjust the communication device's resource scheduling accordingly using the above techniques to reduce out-of-band emissions or interference into the incumbent receiver. For example, an resource scheduler 172 that is aware of the channel and equipment using the channel could avoid the use of certain resource blocks where the satellite receiver is centered (over its occupied bandwidth), and judiciously assign neighboring resource blocks to avoid exceeding out-of-band emission or adjacent or alternate channel/blocker interference constraints into the satellite receiver (in a manner similar to that described above). As described, these assignments may vary for tracking satellite dishes depending on the time of day (and their antenna pointing angles, which fit generally known patterns).

The described method improves spectrum sharing around incumbent devices, by reducing the co-adjacent or alternate channel keep-out zones that are necessary around incumbent devices, which can amount to several tens of kilometers in distance. For example, the existing keep-out zone for fixed satellite receivers and Part 90 equipment in the 3650 MHz band is conservatively set at 150 km by the Federal Communications Commission (FCC), and this method can reduce those zones down to 20 kilometers or less. Thus, communication device location aware scheduling can improve interference management, while allowing greater use of areas which otherwise might be precluded from operation.

In addition, once geo-location data is available from communication devices, other more advanced scheduling techniques may be implemented. In one embodiment, enhanced inter-cell interference coordination (for example, eICIC in LTE) becomes much easier to implement, since communication devices' can be determined to be operating on the edge of the cell/sector (near other sectors, which may require a particular frequency re-use pattern or interference protection to be employed). In particular, fractional frequency reuse (where uplink frequency resource allocations are sub-divided and assigned only for cell/sector-edge users, and not for more central cell/sector users) can be implemented using the described techniques. (All of these mechanisms to enact such frequency re-use and division techniques are currently supported within the $3^{rd}$ generation partnership project standard.) These methods will generally be more accurate than methods that attempt to surmise communication device location from power head room or other signal strength related values, although communication device location information may also be supplemented with power head room information (for example, to help determine if units are indoors). Furthermore, once communication device locations are known, the resource scheduler 172 can avoid scheduling adjacent resource blocks (in frequency) for closely spaced communication devices operating in the same or similar area, or co-channel resource blocks in other sectors/cells to help avoid co-channel or out-of-band emission interference between user equipment (for example, on the uplink). There are numerous other resource scheduler 172 enhancements that can be enabled by employing communication device location data, including improved cell/sector selection algorithms (by forcing communication devices onto the best or least-loaded sectors based on their current operating location). In this manner, the base station can force communication devices onto other cells/sectors based on their location.

The resource scheduler 172 provided herein may be applied to Long Term Evolution (LTE) systems (for example, 3GPP B42/B43 systems in the 3.5 GHz band, or cellular systems in the AWS-3 band in the U.S.) and may help existing communication devices meet the required spectral mask for operation in shared bands. In some embodiments, the resource scheduler 172 determines the channel assignment location within the overall band, communication device out-of-band emission characteristics and corresponding resource block allocations for each device model in the system, connection/bearer quality of service requirements (for example, latency tolerance, guaranteed bit rate, etc.), and optionally communication device location, power head room, signal to interference plus noise ratio, time-of-day, etc.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising an electronic processor) to perform a method as described and claimed herein. Examples of such computer-readable storage medium include, but are not limited to, a hard disk, a CD-ROM, an optical storage device, a magnetic storage device, a ROM (Read Only Memory), a PROM (Programmable Read Only Memory), an EEPROM (Erasable Programmable Read Only Memory), an EEPROM (Electrically Erasable Programmable Read Only Memory) and a Flash Memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method of assigning a frequency resource allocation to a communication device, the method comprising:
   determining a communication device model associated with the communication device;
   determining at least one transmitter out of band emission threshold associated with a frequency range;
   receiving at least one communication device emission level based on at least the communication device model;
   determining, with a resource scheduler, the frequency resource allocation for the communication device to operate in a communication channel based on the at least one transmitter out of band emission threshold and the at least one communication device emission level, wherein the at least one communication device emission level is not greater than the at least one transmitter out of band emission threshold for the frequency range; and
   assigning the frequency resource allocation to the communication device.

2. The method of claim 1, wherein receiving the at least one communication device emission level based on at least the communication device model comprises accessing a database including a plurality of communication device emission levels.

3. The method of claim 1, further comprises determining a transmit power level reduction for the communication device to operate in the communication channel.

4. The method of claim 1, wherein determining, with the resource scheduler, the frequency resource allocation for the communication device to operate in a communication channel within the frequency range is further based on a location of the communication device.

5. The method of claim 1, wherein determining, with the resource scheduler, the frequency resource allocation for the communication device to operate in the communication channel is further based on a channel assignment of the communications channel within the frequency range.

6. The method of claim 5, wherein the channel assignment is determined via a spectrum sharing database.

7. The method of claim 1, wherein determining, with the resource scheduler, the frequency resource allocation for the communication device is based on a quality of service of a connection between the communication device and a base station.

8. The method of claim 4, wherein determining, with the resource scheduler, the frequency resource allocation for the communication device to operate in the communication channel is further based on a location associated with an incumbent device, and a distance between the communication device and the incumbent device.

9. The method of claim 1, wherein determining, with the resource scheduler, the frequency resource allocation for the communication device to operate in the communication channel is further based on a distance between the communication device and a base station.

10. The method of claim 1, wherein determining the transmitter out of band emission threshold associated with the frequency range includes receiving the transmitter out of band emission threshold from a database having at one or more frequency ranges and incumbent device model identifiers stored in the database.

11. A system for assigning a frequency resource allocation to a communication device, the system comprising:
a resource scheduler including an electronic processor, the electronic processor configured to
determine a communication device model associated with the communication device;
determine a transmitter out of band emission threshold associated with a frequency range;
receive at least one communication device emission level based on at least the communication device model;
determine the frequency resource allocation for the communication device to operate in a communication channel based on the transmitter out of band emission threshold and the at least one communication device emission level, wherein the at least one communication device emission level is not greater than the transmitter out of band emission threshold for the frequency range; and
assign the frequency resource allocation to the communication device.

12. The system of claim 11 further comprising a base station configured to receive the frequency resource allocation.

13. A method of assigning a frequency resource allocation to a communication device, the method comprising:
receiving a frequency resource allocation request from a communication device;
determining whether one or more incumbent devices are located near the communication device;
determining a communication device model associated with the communication device;
determining a transmitter out of band emission threshold associated with a frequency range in which the communication device operates;
receiving at least one communication device emission level based on at least the communication device model;
determining, with a resource scheduler, the frequency resource allocation for the communication device to operate in a communication channel based on the transmitter out of band emission threshold, the at least one communication device emission level and whether one or more incumbent devices are located near the communication device, wherein the at least one communication device emission level is not greater than the transmitter out of band emission threshold associated with the frequency range; and
assigning the frequency resource allocation to the communication device.

14. The method of claim 13, further comprises determining a transmit power level reduction for the communication device to operate in the communication channel.

15. The method of claim 13, wherein determining, with the resource scheduler, the frequency resource allocation for the communication device is further based on a location of the communication device.

16. The method of claim 13, wherein determining, with the resource scheduler, the frequency resource allocation for the communication device is based on a quality of service of a connection between the communication device and a base station.

17. The method of claim 13, wherein determining, with the resource scheduler, the frequency resource allocation for the communication device to operate in the communication channel is further based on a location associated with the one or more incumbent devices.

18. The method of claim 13, wherein determining, with the resource scheduler, the frequency resource allocation for the communication device to operate in the communication channel is further based on a distance between the communication device and the one or more incumbent devices.

19. The method of claim 13, wherein determining, with the resource scheduler, the frequency resource allocation is further based on a distance between the communication device and a base station.

20. The method of claim 13, wherein determining the transmitter out of band emission threshold associated with the frequency range includes receiving the transmitter out of band emission threshold from a database having one or more frequency ranges and incumbent device model identifiers stored in the database.

* * * * *